US012594806B2

(12) United States Patent
Frye et al.

(10) Patent No.: US 12,594,806 B2
(45) Date of Patent: Apr. 7, 2026

(54) VEHICLE SUSPENSION CONTROL SYSTEM

(71) Applicant: Tesla, Inc., Austin, TX (US)

(72) Inventors: Blane Frye, San Francisco, CA (US); Soroush MohammadJafaryvahed, Santa Clara, CA (US); Aleksei Potov, Los Gatos, CA (US); Julian Pitt, East Palo Alto, CA (US); Harris Yong, Sunnyvale, CA (US); Oruganti Prashanth Sharma, Campbell, CA (US)

(73) Assignee: Tesla, Inc., Austin, TX (US)

( * ) Notice: Subject to any disclaimer, the term of this patent is extended or adjusted under 35 U.S.C. 154(b) by 179 days.

(21) Appl. No.: 18/592,982

(22) Filed: Mar. 1, 2024

(65) Prior Publication Data

US 2024/0294048 A1     Sep. 5, 2024

Related U.S. Application Data

(60) Provisional application No. 63/449,269, filed on Mar. 1, 2023.

(51) Int. Cl.
| | |
|---|---|
| B60G 17/018 | (2006.01) |
| B60G 17/04 | (2006.01) |
| G01C 21/00 | (2006.01) |
| G01C 21/34 | (2006.01) |

(52) U.S. Cl.
CPC ........... B60G 17/018 (2013.01); B60G 17/04 (2013.01); G01C 21/3461 (2013.01); G01C 21/3815 (2020.08); G01C 21/3841 (2020.08); B60G 2400/10 (2013.01); B60G 2400/821 (2013.01); B60G 2800/914 (2013.01)

(58) Field of Classification Search
CPC .. B60G 17/018; B60G 17/04; B60G 2400/10; B60G 2400/821; B60G 2800/914; B60G 2300/50; B60G 2400/102; B60G 2600/02; B60G 2600/0422; B60G 2800/162; B60G 17/0195; B60G 2400/204; B60G 2400/824; B60G 2401/142; B60G 2401/16; B60G 2500/10; B60G 2500/20; B60G 2500/30; B60G 17/0165; G01C 21/3461; G01C 21/3815; G01C 21/3841; G01C 21/3848
See application file for complete search history.

(56) References Cited

U.S. PATENT DOCUMENTS

| | | | | |
|---|---|---|---|---|
| 10,486,485 B1 * | 11/2019 | Levinson | ........... | B60G 17/0162 |
| 2014/0297116 A1 * | 10/2014 | Anderson | ............ | B60G 17/019 |
| | | | | 701/37 |
| 2022/0169260 A1 * | 6/2022 | Strobel | .................... | G05D 1/81 |

(Continued)

*Primary Examiner* — Sahar Motazedi

(74) *Attorney, Agent, or Firm* — Schwegman Lundberg & Woessner, P.A.

(57)     ABSTRACT

Systems and methods for vehicle suspension control. An example method includes obtaining a road roughness map associated with a geographic area in which the vehicle is located, the road roughness map reflecting road condition metrics for road segments that form roads included in the geographic area. Based on the road roughness map, it is determined that a threshold percentage of road segments along an upcoming threshold distance of a navigable route exceed a threshold road condition metric. Suspension of the vehicle is adjusted, with the suspension being adjusted to reduce the effects of road roughness.

20 Claims, 7 Drawing Sheets

(56)     References Cited

U.S. PATENT DOCUMENTS

| | | | |
|---|---|---|---|
| 2022/0281280 A1* | 9/2022 | Praet | B60G 17/06 |
| 2022/0379679 A1* | 12/2022 | Eisenmann | B60G 17/0165 |
| 2023/0053785 A1 | 2/2023 | Carvalho et al. | |
| 2023/0311606 A1* | 10/2023 | Kojchev | B60G 17/0165 |
| | | | 280/5.518 |
| 2024/0317008 A1* | 9/2024 | Giovanardi | G01C 21/30 |
| 2025/0100559 A1* | 3/2025 | Jiang | B60W 30/025 |

* cited by examiner

300

302
Obtain road roughness map associated with geographic area

304
Determine, based on road roughness map, trigger information associated with adjusting suspension 306
Cause first adjustment of suspension 308
Update user interface 310
Cause second adjustment of suspension based on road roughness map

320

322

Monitor measures associated with road roughness during operation of vehicle

324

Perform processing of measures to generate road condition information

326

Provide, to central server, road condition information as associated with road segments

400

402

Obtain, from multitude of vehicles, road condition information

404

Determine road metrics associated with road segments

406

Generate road roughness map information for transmission to vehicles

VEHICLE SUSPENSION CONTROL SYSTEM

CROSS-REFERENCE TO RELATED APPLICATIONS

This application claims priority to U.S. Prov. Patent App. No. 63/449,269 titled "VEHICLE SUSPENSION CONTROL SYSTEM" and filed on Mar. 1, 2023, the disclosure of which is hereby incorporated herein by reference in its entirety.

TECHNICAL FIELD

The present application relates to vehicle suspension control. More particularly, one or more aspects of the present application relate to vehicle suspension control based on sensor information.

BACKGROUND

To enhance ride comfort, some vehicles can adjust certain suspension settings based on user input from drivers of the vehicles. For example, a vehicle may have different suspension modes in which a driver can place the suspension. An example mode may include a sport mode where the vehicle is able to more easily corner. Another example mode may include a comfort mode where the vehicle suspension is softened to improve comfort. Drivers may prefer certain suspension settings or modes and thus cause the vehicle to use those settings or modes.

Additionally, some vehicles have active suspension which may adjust suspension settings to control movement of the vehicle's wheels and axles relative to vehicle frame. Active suspension is contrast with passive suspension which relies on passive springs. These vehicles may react to road conditions to keep tires consistently perpendicular to the road (e.g., when turning corners).

SUMMARY

Example aspects are directed to systems and methods. An example method is implemented by a system of one or more processors configured for inclusion in a vehicle. The method includes obtaining a road roughness map associated with a geographic area in which the vehicle is located, the road roughness map reflecting road condition metrics for a plurality of road segments that form roads included in the geographic area; determining, based on the road roughness map, that a threshold percentage of road segments along an upcoming threshold distance of a navigable route exceed a threshold road condition metric; and causing adjustment of suspension of the vehicle, wherein the suspension is adjusted to reduce the effects of road roughness.

BRIEF DESCRIPTION OF THE DRAWINGS

The present disclosure is described with reference to the accompanying drawings, in which like reference characters reference like elements, and wherein.

DETAILED DESCRIPTION

Figure 1A:
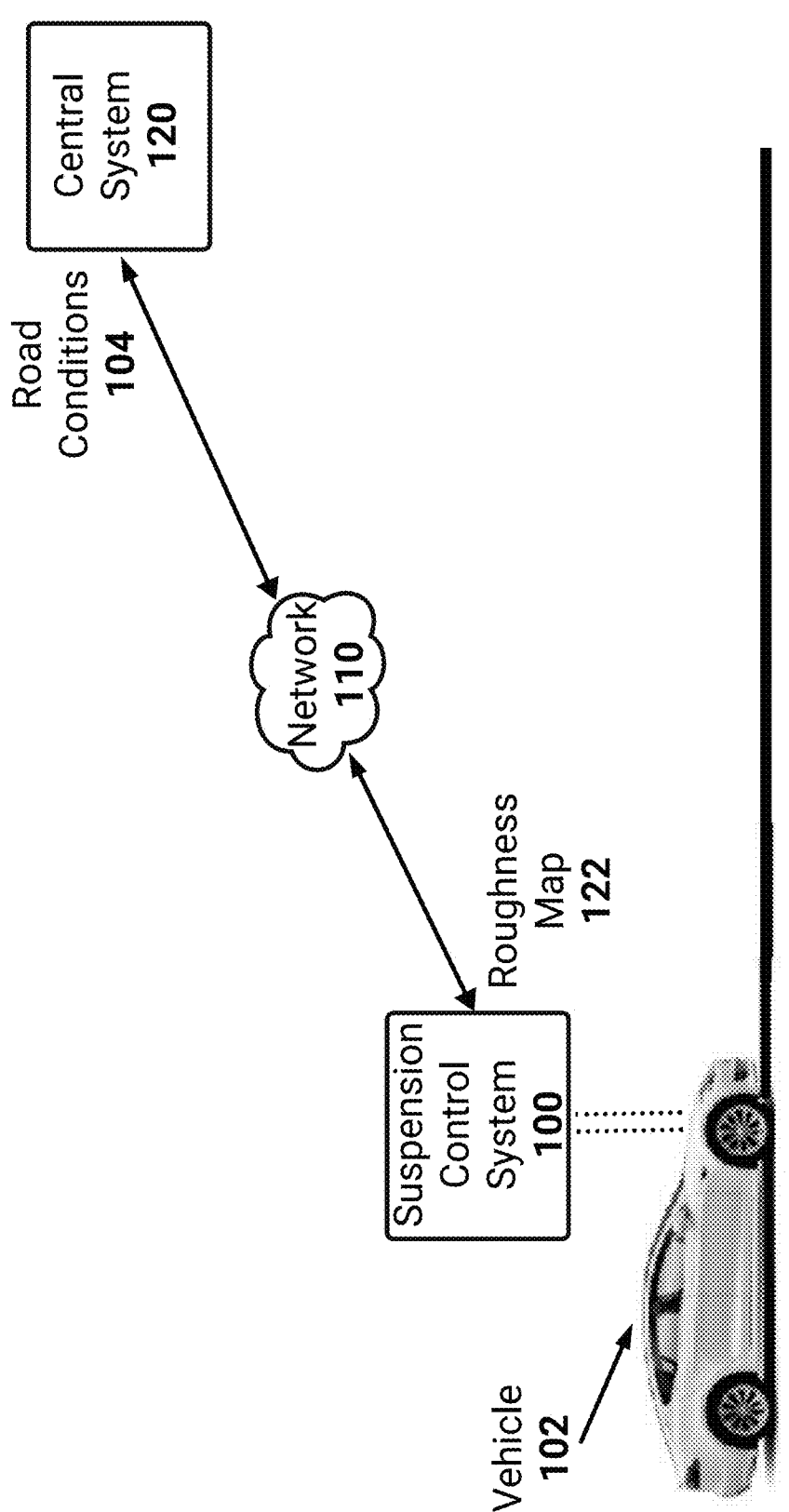
FIG. 1A is a block diagram of an example vehicle adjusting suspension settings based on a road roughness map.

This application describes techniques to improve driving comfort, and with respect to electric vehicles, improve range through intelligent adjustments of suspension. As will be described, a vehicle may receive a road roughness map (also referred to as a roughness map) which informs road segments that are expected to be rough or otherwise reduce a driving experience of persons within the vehicle. A road segment in this application may refer to a portion of a road, such as a particular length (e.g., 5 meters, 10 meters, 20 meters). While road segment is described, as may be appreciated in some embodiments the road roughness map may map specific roughness metrics or characteristics to specific road coordinates.

Based on the road roughness map, a vehicle may determine to adjust suspension prior to traversing over a rough portion of a road. In some embodiments, adjusting the suspension may include raising or lower the car (e.g., adjusting the ride height) for example via adjusting an air suspension of the vehicle. To improve ride comfort the vehicle may be adjusted upward, such that the ride height is higher. This increase in ride height may allow for a reduction in perceived jostling. Subsequent to traversing over the rough portion, the vehicle may lower such that the ride height is lower.

With respect to an electric vehicle, an increased ride height may reduce how aerodynamic the electric vehicle is. Range may therefore be reduced such that the electric vehicle requires additional charging stops. The techniques described herein, while beneficial to either electric or internal combustion engine vehicles, may provide particular advantages to electric vehicles. As will be described, the vehicle may automatically adjust ride height to increase passenger comfort while also respecting efficiency (e.g., average energy consumption per kilometer). For example, the vehicle may raise, or lower, seamlessly when needed.

The road roughness map may be generated via aggregating information from a fleet of vehicles. For example, a vehicle may determine measures or metrics (hereinafter measures) associated with road roughness during operation of the vehicle. Example measures may include vertical acceleration adjustments. Measures may additionally include horizontal acceleration adjustments. For example, when driving over potholes the vehicle may undergo vertical adjustments as it goes over potholes. A central system (e.g., system 120) may aggregate these measures received from the fleet to identify rough road segment or to determine specific roughness metrics for specific road coordinates. As may be appreciated, the vehicle or central system may distinguish between rough road and normal roads which have, for example, periodic troughs and valleys.

The suspension system of a conventional vehicle uses a combination of springs, shock absorbers and various linkage members to provide the desired level of handling and control while isolating the vehicle's occupants from unwanted road noise, vibrations, and road bumps. Although most vehicles use mechanical springs, for example coil springs or leaf springs, some performance and luxury vehicles use air springs. Vehicle suspension may provide ride leveling, a smooth ride, ride height adjustment, stiffness adjustment, rebound adjustment, and damping adjustment. Adjustments may be made to improve vehicle aerodynamics at high speeds, vehicle access, vehicle handling of road conditions, vehicle handling of road surfaces, such as a rough surface, and/or road clearance.

A system described herein (e.g., the suspension control system 100) may adjust the suspension based on environmental conditions. Specifically, in one embodiment, the vehicle suspension may be based on dynamic environmental conditions, such as temperature, air quality, weather conditions, and condition associated with traveling surfaces. Illustratively, in one embodiment, the environmental conditions can include road conditions that can be determined across a group of vehicles and shared. The road conditions can be generally embodied or combined with navigational inputs, which may be referred to as a road roughness map.

In one embodiment, a road roughness map may include a multitude of locations and corresponding road roughness data. Optionally, the road roughness map may include optimum vehicle settings (e.g., for the locations). A road roughness map may be generated based on data received from a multitude of vehicles. The multitude of vehicles may generate data associated with the location of the road roughness and the type and severity of the road roughness condition. As described above, the data may be collected at a central system where it can be processed to generate a road roughness map. The road roughness map may be received by an individual vehicle. The system may adjust the suspension of the vehicle prior to, or when it arrives at, a location based on the road roughness map and the vehicle's location.

While there are a variety of automatic and user-controlled systems that are used to adjust the suspension of a vehicle, it would be beneficial to provide an automatic system that can automatically adjust the vehicle's suspension based on a road roughness map and the vehicle's location. The disclosed technology provides such a system.

Although aspects of the present application are described with regard to vehicles such as trucks, specific suspension systems, values for suspension system values (e.g., values for controllable components), and suspension modes, one skilled in the art will appreciate that reference to these examples are illustrative in nature and should not be construed as limiting.

Additionally, although the various aspects will be described in accordance with illustrative embodiments and a combination of features, one skilled in the relevant art will appreciate that the examples and combination of features are illustrative in nature and should not be construed as limiting. More specifically, aspects of the present application may be applicable to various types of vehicle data or vehicle processes. However, one skilled in the relevant art will appreciate that the aspects of the present application are not necessarily limited to application to any particular type of vehicle data, data communications or illustrative interaction between third parties, customers, and a network service provider.

Block Diagrams

FIG. 1A is a block diagram of an example vehicle 102 adjusting suspension settings based on a road roughness map 122.

Generally described, aspects of the present application correspond to an adjustable suspension system. More specifically, one or more aspects of the present application correspond to a system (e.g., the suspension control system 100) for dynamically managing individual suspension settings for a vehicle based on a determined suspension mode. In some embodiments, the suspension settings may include adjusting a ride height upwards or downwards. For example, there may be a standard higher setting that adjusts the ride height upwards. As another example, there may be a standard normal setting that corresponds to the lowered height.

Illustratively, the system 100 may obtain a road roughness map 122. For example, a road roughness map 122 may be received via a network 110 (e.g., wireless communication, such as cellular or Wi-Fi) from a central system 120. The road roughness map 122 may reflect, in some embodiments, a layer or metadata associated with a navigation map usable by the vehicle to navigate to destinations. Thus, the road roughness map 122 may be stored on the vehicle 102. As described herein, the road roughness map 122 may include information that characterizes attributes of road surfaces, attributes of the traversability of road services, or a combination.

For example, a characterization of a road surface as "rough" may be indicative of a level debris on the road service, the condition of the surface of the road, or characterizations of performance of one or more vehicles on the road surface. As another example, a characterization of a rough road may include a minimal area of road surface that includes rough patches of road, types of road surfaces, or other road features that may affect the ride comfort of a vehicle.

The road roughness map 122 may be generated by leveraging road condition information 104 from a fleet of vehicles. The suspension control system 100 may obtain sensor inputs that corresponds to measures related to, or attributed to, the vehicle or an environment around the vehicle including current velocity, location, ground clearance measurements, vehicle status, historical information regarding previous measurements, and the like. Thus, the system 100 may determine road condition information 104 that reflects measured road roughness measures (also referred to herein as road condition metrics or scores) as being associated to specific location or a specific road segment. As will be described, in some embodiments the road roughness measures may be specific to a particular lane along a road (e.g., a first lane may have potholes while a second lane may not have potholes). For example, camera or other sensor data may be used to determine a lane in which the vehicle 102 is driving. In some embodiments, these measures may be taken, or otherwise received, by a restraints control module (RCM). Example measures include acceleration (e.g., vertical acceleration) experienced by the vehicle.

As may be appreciated, the system 100 may filter measures which are unlikely to be associated with road roughness. For example, vertical acceleration may be filtered based on whether motion frequency is likely to be harsh or unpleasant to a passenger. In this example, an example frequency range may include between 4-6 Hz, 5-8 Hz, 7-10 Hz, 4-10 Hz, and so on. In contrast, frequency of 1 Hz, 2 Hz, may be associated with primary motion.

The road condition information 104 may be shared with the central system 120, which aggregates the information from the fleet and generates the road roughness map 122. The minimal area of road surface can be utilized to filter minor defects or temporary defects in road surfaces that may not be sufficient to elicit a response in dynamic adjustment of a suspension.

As described herein, the suspension control system 100 uses the road roughness map 122, along with the vehicle's 102 location (e.g., obtained via GPS), to automatically adjust the suspension of the vehicle 102. The suspension of the vehicle may be adjusted through air springs or other types of suspension components. As a result, the vehicle is able to have a smoother, safer ride through certain road roughness. In addition, the vehicle is able to better handle adverse conditions.

The suspension control system 100 may automatically adjust the vehicle's 102 suspension based on the road roughness map 122 and the vehicle's 102 location. For example, a road may have a very steep pitch with a sharp change in incline at the bottom of the pitch. Alternately, the road may have a series of speed bumps. Alternatively, the road may have a series of potholes, or the road may turn into a gravel road. By integrating road roughness map information 122, navigation information and suspension adjustment profiles/configurations, the vehicle 102 may automatically adjust ride height as a vehicle is in operation.

In some embodiments, the vehicle 102 can process navigation information and the road roughness map 122 to identify trigger events associated with adjusting the vehicle's suspension. Such triggering events can include approaching preset location(s), changes in speeds or directions, changes in lanes, traffic patterns, and the like. The resulting adjustments can assist in avoiding potential vehicle damage, providing better vehicle operation ride, reducing wear on components, and the like. The system may be configured to monitor vehicle speed using sensors, thus ensuring that regardless of vehicle speed, the suspension will be adjusted prior to reaching each location. The system can also be configured to begin adjusting ride height a preset distance before reaching a location, thus ensuring that the desired suspension setting is achieved before the vehicle reaches the preset location.

The road roughness map 122 may include, in some embodiments, at least one location and a determined suspension setting or a determined road roughness information. The road roughness information may include, for example, the coordinates of each location in which the suspension is to be automatically adjusted. The information may also include the corresponding suspension settings, suspension mode, or road roughness for each location. The road roughness information may, in some embodiments, also include trigger zones or trigger event zones in which one or more additional vehicles have detected trigger events for determining a change in adjustment. As may be appreciated, there are a variety of techniques which can be used to generate road roughness information. An example of generating this information is described below.

Exemplary techniques for generating road roughness map, described in detail below, include determining coordinates based on the vehicle's current location when the vehicle encounters a road condition (e.g., road roughness). The vehicle's current location may be determined by the vehicle's navigation/GPS system. The road condition may be determined through various vehicle sensors.

For example, a vehicle may be driving down a roadway. The roadway may have a multitude of potholes at a first location along the roadway. The vehicle may sense the road roughness as it drives over the potholes through its sensors. The vehicle may determine there is a road roughness and or the type of road roughness or that certain sensors values exceed a threshold value. The vehicle may additionally determine or otherwise monitor its location via a GPS system. The vehicle may be monitoring its location continuously via a GPS system or may determine its location in response to determining a road roughness. The location of the road roughness may include a start and ending point of the road roughness. The vehicle may then send this information including the location of the road roughness and the road roughness, where the road roughness may include the sensor values or the determined road roughness, to the central system 120. The vehicle may further continuously send this information regardless of threshold or determination to a central server. The central server may be a cloud, a central computer, or any central location. There may be more than one central server that receives the data from the vehicle.

After the vehicle 102 receives the road roughness map 122 as described above, the suspension control system 100 may adjust the vehicle's suspension as it approaches a road segment indicated as being rough. In some embodiments, the roughness map 122 may label, or otherwise characterize, road segments as being rough or not rough. In some embodiments, the roughness map 122 may have measures or scores associated with the roughness. For example, these measures or scores may be associated with specific coordinates or road segments (e.g., a road segment may have a measure of 0.3, in an embodiment in which the measures are normalized between 0 and 1). The measures or scores may inform whether the suspension control system 100 is to adjust suspension (e.g., raise the ride height).

For example, if the vehicle 102 is navigating towards a destination the system 100 may determine not to raise the ride height if the measures or scores are below a threshold based on a current state of charge of an electric battery. In this example, the vehicle 102 may prioritize range if the state of charge is below a threshold. Optionally, a user setting may inform when to adjust the ride height upwards. For example, a user may prefer that only roughness associated with measures or scores greater than a threshold should cause the vehicle to adjust suspension. The suspension adjustment may further be based on sensor values associated with the vehicle such as weight in the vehicle. For example, a heavier or lighter car may affect how pronounced a rough road segment it.

After the location, or region, has been passed, the system 100 may automatically re-adjust the suspension of the vehicle 102 to either be set to its pre-adjusted suspension or in accordance with preset suspension configuration instructions (e.g., a standard or normal suspension setting). Note that the standard suspension setting may be preset by the user, preset by the vehicle manufacturer, preset by a third party (e.g., service technician), or based upon vehicle speed.

In at least one embodiment, rather than requiring road roughness map have end location coordinates, the suspension control system 100 may allow the roughness map 122 to inform a distance over which the ride height is to be adjusted. Preferably in this embodiment the map 122 may identify initial coordinates and may be used to set the size of a geo-fence. The geofence may reflect a region bounded by a logical definition of geographic coordinates over which the system 100 may adjust the vehicle's suspension in accordance with the road roughness map 122. In an example embodiment, the geo-fence is in the form of a circle with the circle's center defined by the coordinates of the road roughness map. The system can be configured to automatically apply a standard size for the geo-fence, where the standard geo-fence radius is preset by the user, preset by the vehicle manufacturer, or preset by a third party (e.g., service technician).

While navigating towards a destination, the suspension control system 100 may determine an extent to which an upcoming road portion is expected to be rough. For example, the system 100 may look-ahead a threshold distance (e.g., 2 kilometers, 3 kilometers, 5 kilometers, 7 kilometers) and determine a percentage of the threshold distance which is expected to be rough. The system 100 may determine whether this percentage exceeds a threshold, and if so, trigger an adjustment of the suspension (e.g., raise the ride height). For example, the percentage may be 20% and the threshold distance may be 4 kilometers. In this example, the system 100 may raise the ride height based on at least 800 meters of the 4 kilometers being indicated in the map 122 as being rough. The trigger may further require that the vehicle 102 is within a threshold distance of the start of a rough road segment (e.g., within 100 meters, 200 meters, and so on, which may optionally be adjusted according to vehicle speed).

Illustratively, a suspension system in the vehicle 102 may include a multitude of individually controllable components, such as bellows, struts, air shocks, or shocks, by specifying values or commands for each controllable component. For example, the vehicle 102 may have four individually controllable components corresponding to a suspension component located approximate to the vehicle wheels. In accordance with aspects of the present application, a determined suspension mode includes a specification of individual values or changes in values for the multitude of controllable components, such as raising, lowering or maintain a current setting for the controllable component.

By way of illustrative example, a first mode may correspond to a lowering of the multitude of controllable components to effectively drop the height of the vehicle 102 to a lowest point. In another example, a second mode may correspond to lowering two controllable components corresponding to the rear wheels of the vehicle 102 and raising two controllable components corresponding to front wheels of the vehicle 102 to achieve a particular angle between a rear edge of the vehicle with the ground.

In yet another example, a third mode, may correspond to a lowering of the multitude of controllable components to effectively drop the height of the vehicle 102 to a threshold point selected for movement of the vehicle 102 in certain types of roads/conditions. In yet another example, a fourth mode, may correspond to a raising of the multitude of controllable components to effectively raise the height of the vehicle 102 to a higher point. In yet another example, a fifth mode, may correspond to an adjustment of the rebound, stiffness, or damping of the suspension to manage road roughness.

The suspension control system 100 may further implement various validation processes that can validate the determined suspension mode. For example, the system 100 can be configured with various processing rules that can consider whether sensor data, such as velocity, vehicle status (e.g., door open, tailgate open, etc.) prohibit the determined suspension mode. In another example, the system 100 can obtain validation or confirmation from a user or system administrator that present secondary or confirmatory authority to modify the suspension settings. The system 100 can then transmit or otherwise cause the modifications to vehicle settings, such as causing the change in the controllable components or other modification to the vehicle operation, such as preventing switching to driving, activating brakes, activating cameras, and the like.

Figure 1B:
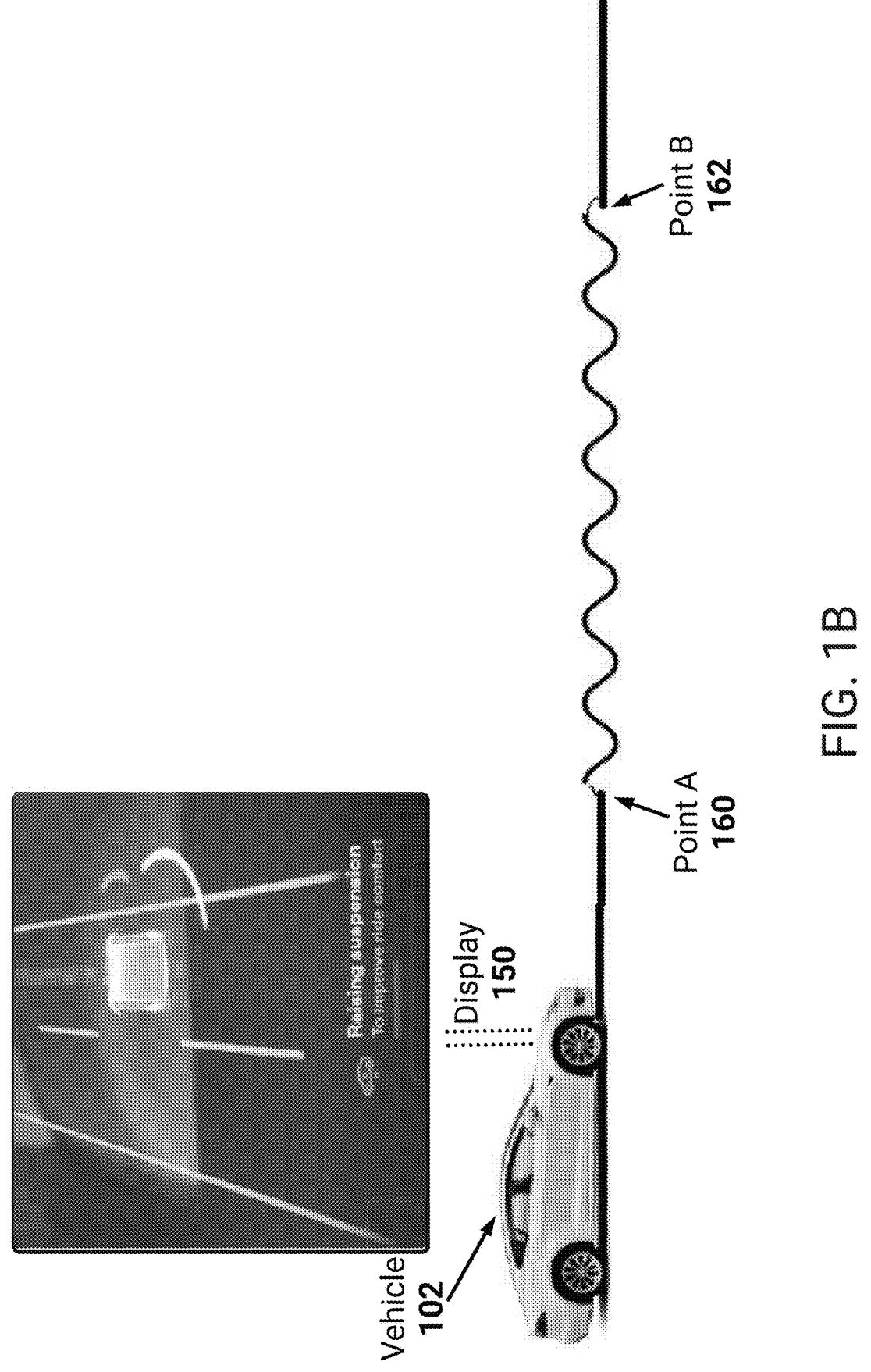
FIG. 1B is a block diagram of the example vehicle updating a user interface based on the road roughness map.

FIG. 1B is a block diagram of the example vehicle 102 updating a user interface 150 based on the road roughness map. As described in FIG. 1A, the vehicle may be driving along a roadway, or navigating along a route, which in the illustrated example has a point 160 where the roadway becomes rough. The vehicle 102 may use the road roughness map to identify this point 160. For example, the vehicle 102 may determine that it is approaching a road segment that includes the point 160. As another example, the vehicle 102 may determine that a road segment starting at the point 160 is indicated as being rough.

In response, the vehicle 102 may therefore update its suspension as described herein. For example, the vehicle 102 may increase a ride height to reduce the effects of the roughness while traversing between point 160 and point 162 where the road returns to normal (e.g., not rough).

The vehicle 102 may, in some embodiments, include a display 150 which presents a user interface. As illustrated, the user interface may indicate that the suspension is being raised to improve ride comfort.

Subsequent to point 162, the vehicle 102 may lower the suspension to return to normal or standard ride height. To ensure that the vehicle 102 is not adjusting suspension to a distracting degree, the vehicle 102 may, in some embodiments, the vehicle 102 may look-ahead a threshold distance and determine whether the percentage of the distance is less than a threshold (e.g., 3%, 5%, 10%). Additionally, the vehicle 102 may avoid lowering the ride height if less than a threshold amount of time has elapsed since the ride height was raised.

Figure 2:
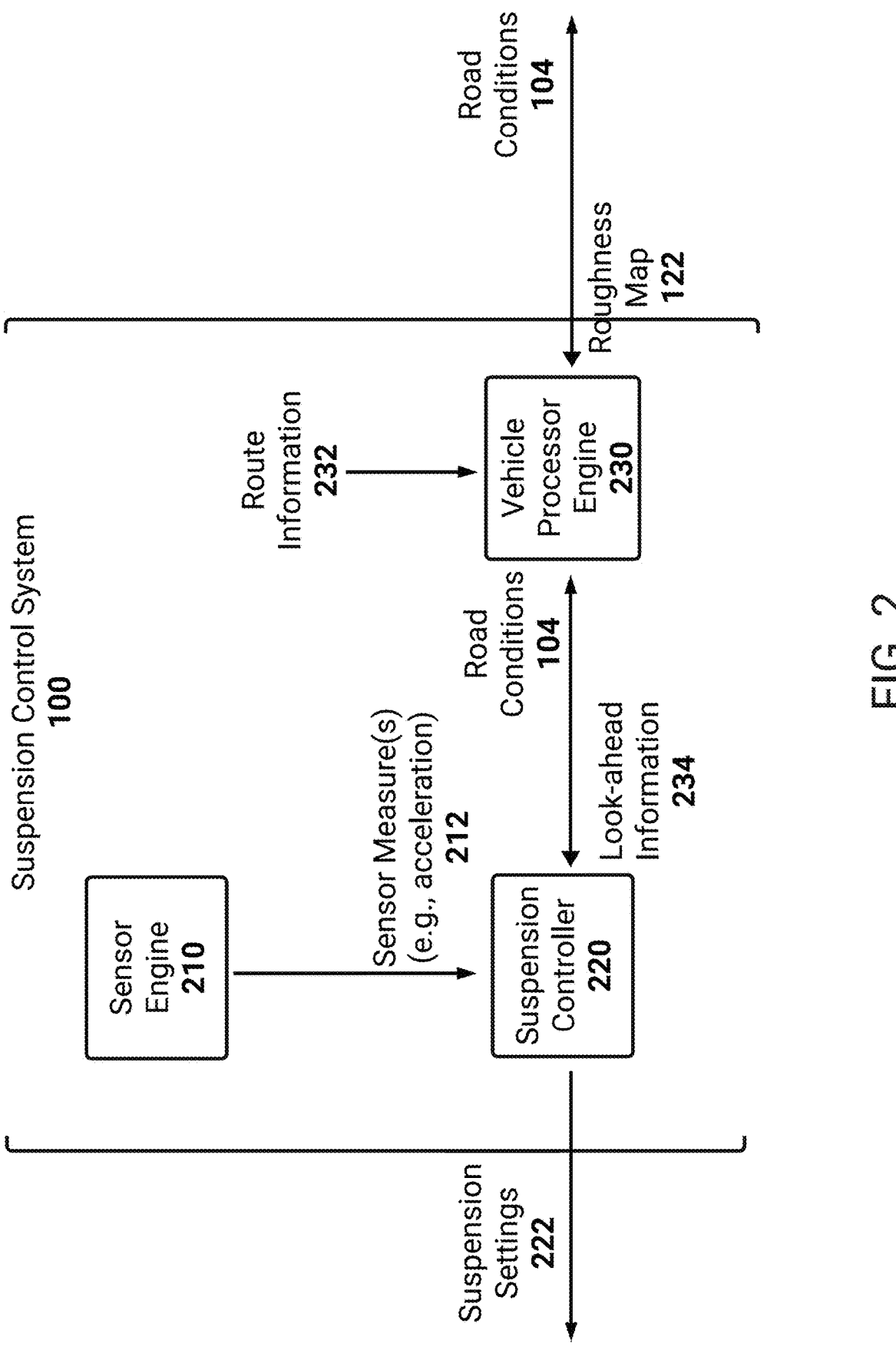
FIG. 2 is a block diagram of an example suspension control system outputting suspension settings based on a received road roughness map.

FIG. 2 is a block diagram of an example suspension control system 100 outputting suspension settings 222 based on a received road roughness map 122. As described above, the suspension control system 100 may adjust a vehicle's suspension based on a road roughness map 122 which informs an extent to which road segments in a geographic area or characterized as being rough.

The suspension control system 100 may represent a system of one or more processors and/or microcontrollers. For example, the system 100 may include a sensor engine 210 which determines measures 212 associated with roughness (e.g., road condition metrics). In this example, the measures 212 may include acceleration measurements (e.g., discrete measurements which are adjusted over time). Thus, the acceleration measurements may be used to inform roughness frequency. The suspension controller 220 may receive the measures 212 and determine road condition information 104 for transmission to a central system (e.g., the central system 120). For example, the suspension controller 220 may monitor vertical acceleration adjustments which are greater than a threshold and within a period of time. In this example, the controller 220 may determine a road condition metric for a road segment based on the acceleration measurements. Thus, a road segment with potholes may have rapid vertical acceleration adjustments.

The suspension controller 220 may additionally obtain look-ahead information 234 to determine an extent to which upcoming road segments are expected to be rough based on the map 122. For example, a vehicle processor engine 230 may receive the road roughness map 122 from the central system. The engine 230 may additionally have access to navigation or map data associated with a geographic region. Thus, while the vehicle is driving or navigating, the engine 230 may determine look-ahead information 234 reflecting a threshold distance in front of the vehicle or along a navigable route the vehicle is following.

As described in FIGS. 1A-1B, the suspension controller 220 may cause the suspension settings 222 to be adjusted based on the look-ahead information 234. For example, the controller 220 may determine that a threshold percentage of an upcoming distance is expected to be rough. In this example, the roughness map 122 may indicate that the threshold percentage has road condition metrics greater than a threshold.

In some embodiments, the suspension control system 100 may leverage camera information to inform the suspension settings. For example, the system 100 may execute a machine learning model which determines objects positioned about the vehicle. In this example, the machine learning model may determine static objects such as lane lines, potholes, and so on. Thus, when driving the vehicle may determine in which lane it is located. The road conditions 104 may therefore reflect road conditions 104 for specific lane lines of a road segment. Similarly, the roughness map 122 may indicate roughness for road segments and lanes thereof.

Thus, the vehicle may determine that its specific lane of a road segment is not expected to be rough while another lane line in a same direction is. The vehicle may therefore determine not to adjust the suspension settings 222. However, as may be appreciated the route may cause the vehicle, or likely cause the vehicle, to change lanes (e.g., towards an off ramp, to make a turn, and so on). Thus, the controller 220 may adjust the ride height upwards prior to reaching that road segment if the vehicle is likely to change lanes into a different lane expected to be rough. In some embodiments, the vehicle may autonomously navigate. Thus, the vehicle may prefer to autonomously navigate in the specific lane line rather than the different lane. Thus, the vehicle may not adjust the ride height upwards unless it expects to change lanes into the different lane.

Further description related to a machine learning model and autonomous navigation is included in U.S. Patent Pub. 2023/0053785 which is incorporated herein by reference in its entirety.

Example Flowcharts

Figure 3A:
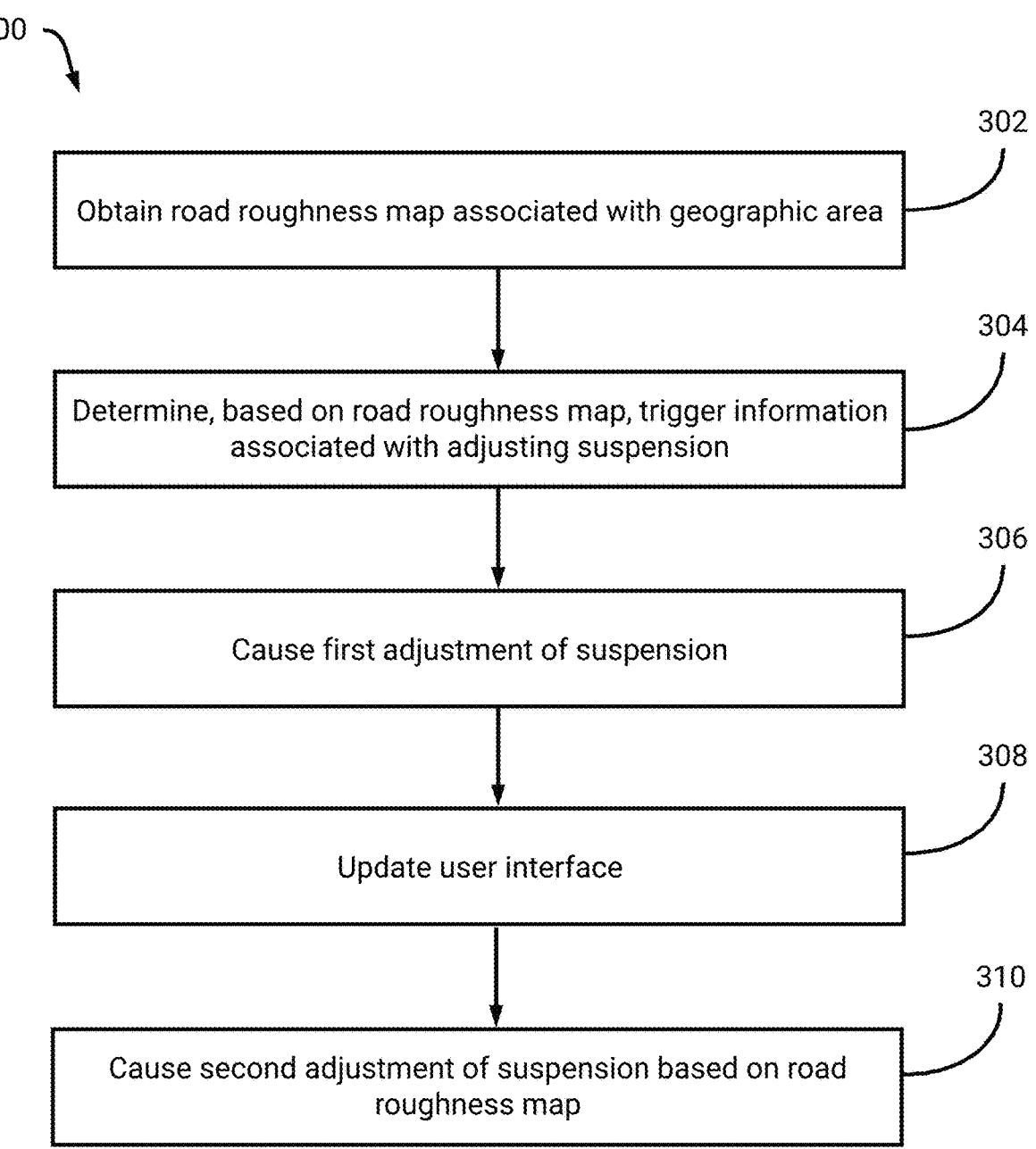
FIG. 3A is a flowchart of an example process for a vehicle to adjust suspension based on a received road roughness map.

FIG. 3A is a flowchart of an example process 300 for a vehicle to adjust suspension settings based on a received road roughness map. For convenience, the process 300 will be described as being performed by a system of one or more processors or microcontrollers (e.g., the suspension control system 100).

At block 302, the system obtains a road roughness map associated with a geographic area. As descried herein, the system may obtain (e.g., via a push or pull) the road roughness map from a central system. The road roughness map may reflect metadata, layer information, annotation information, and so on which is associated with a map of the geographic area. For example, the road roughness map may include individual road condition metrics for individual road segments which form roads (e.g., paved, unpaved) included in the geographic area. The road condition metrics may optionally be values within a range of values, such as zero and one with a higher value optionally indicating a rougher road segment.

At block 304, the system determines trigger information associated with adjusting the suspension. The system may determine that an upcoming threshold percentage of a threshold look-ahead distance has road condition metrics greater than a threshold. For example, the system may determine that the next 800 meters of a 4-kilometer look-ahead distance has road conditions metrics greater than 0.3, 0.4, and so on. The system may also determine that the vehicle is within a threshold distance of an initial road segment with a road condition metric greater than the threshold. In the above examples, the vehicle may be navigating along a route such that the look-ahead distance will be traversed by the vehicle.

At block 306, the system causes first adjustment of the suspension. The system may increase a ride height to reduce the effects of the roughness. Other techniques to adjust suspension are described herein.

At block 308, the system updates a user interface. As described in FIG. 1B, the system may present a message or other information indicating the increase in ride height. In some embodiments, the user interface may present the road roughness map as an overlay over a geographic map. Thus, a driver of the vehicle may ascertain which road segments are rough.

At block 310, the system causes second adjustment of the suspension. As described at least in FIG. 2, the system may lower the ride height after traversing the rough road segments.

Figure 3B:
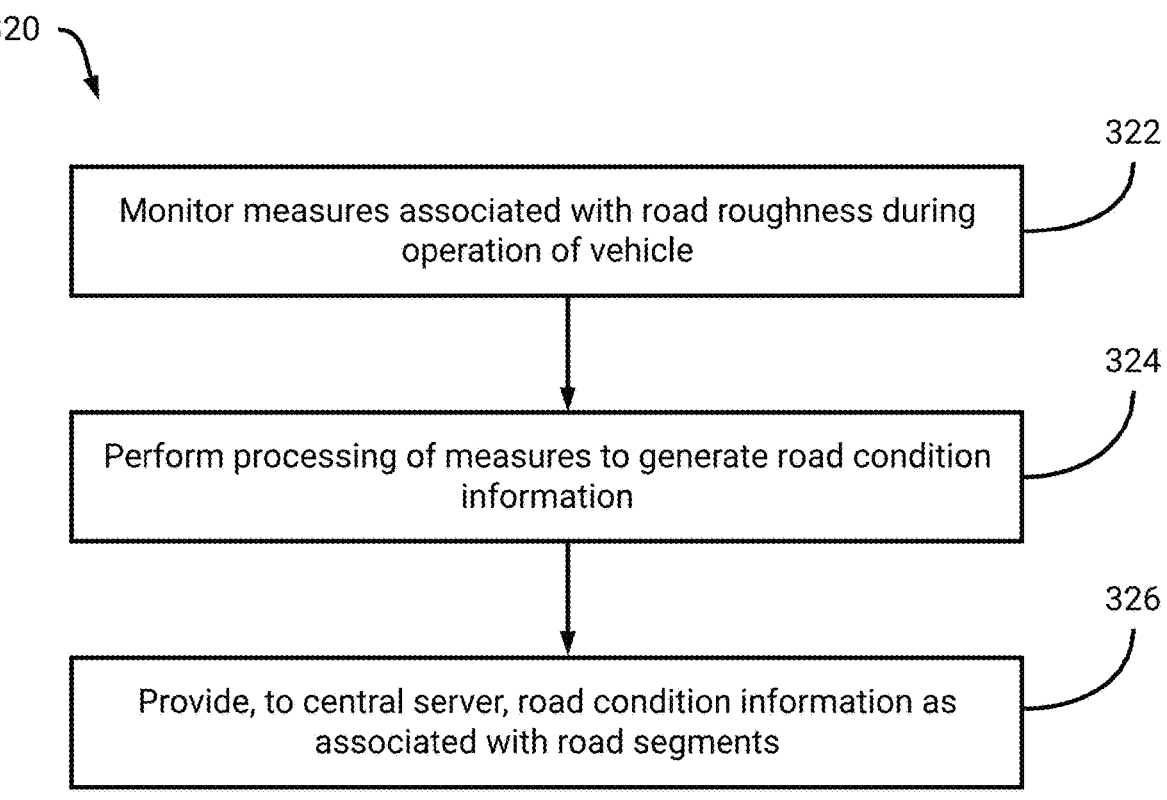
FIG. 3B is a flowchart of an example process for a vehicle to generate road condition information for transmission to a central server.

FIG. 3B is a flowchart of an example process 320 for a vehicle to generate road condition information for transmission to a central server. For convenience, the process 320 will be described as being performed by a system of one or more processors or microcontrollers (e.g., the suspension control system 100).

At block 322, the system monitors measures associated with road roughness during operation of the vehicle. As described above, the vehicle may determine measures associated with, for example, acceleration of the vehicle. The system may optionally filter for vertical acceleration and for movement frequencies below a threshold. The system may associate these measures with locations of the vehicle, such that a central system can ascertain which real-world road segment is rough. In some embodiments, the system may associate the measures with a particular lane line it is traveling in.

At block 324, the system performs processing of the measures to generate road condition information. The system may determine road condition metrics as the vehicle is driving. For example, the road condition metrics may be determined based on the extent to which acceleration changes are occurring (e.g., magnitude, frequency, and so on). This information may be mapped into a metric, for example for every threshold distance the vehicle travels. As an example, the system may determine a metric for a road segment that extends every 5 meters, 10 meters, 15 meters, and so on. The metric may be determined via weighting the acceleration changes over the road segment length. In some embodiments, the acceleration changes may be provided to a machine learning model trained to output a road condition metric. The acceleration changes may additionally be mapped against time to determine frequency, optionally with the changes used for road condition information being within a bandpass window (e.g., 4-6 Hz, 4-10 Hz, 5-9 Hz, and so on). The magnitude associated with frequencies in the window may be determined. In some embodiments, energy, power, spectral density, and so on, which are associated with the mapping may be determined. As may be appreciated, higher values may correspond with higher metrics.

At block 326, the system provides the road condition information to the central server. The central server aggregates road condition information received from a fleet of vehicles to determine road condition metrics for anywhere navigable by the vehicles. In some embodiments, the central server may require at least a threshold number of vehicles to provide road condition information for a road segment before it assigns a road condition metric to the road segment.

Figure 4:
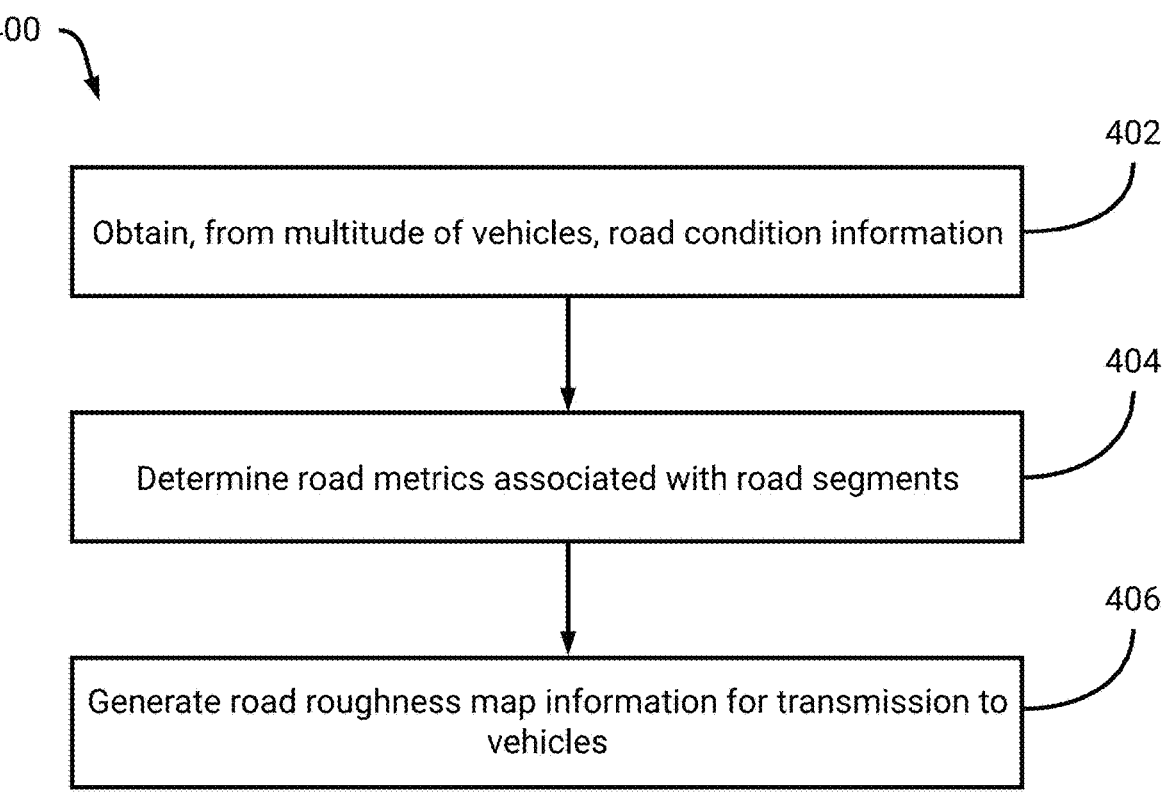
FIG. 4 is a flowchart of an example process for a central server to generate road roughness map(s).

FIG. 4 is a flowchart of an example process 400 for a central server to generate road roughness map(s). For convenience, the process 400 will be described as being performed by a system of one or more processors or microcontrollers (e.g., the suspension control system 100).

At block 402, the system obtains road condition information from a fleet of vehicles. As described above, the system receives uploaded information from vehicles which represent measured road condition metrics for road segments. As may be appreciated, a subset of the vehicles may have information for an individual road segment. Thus, the system aggregates the information such that it can provide a cohesive road roughness map for different geographic areas. Thus, a vehicle which has never driven along a particular road segment may still have information reflecting its roughness.

At block 404, the system determines road metrics associated with road segments (e.g., road condition metrics). The system may average the road condition metrics for a road segment received from the fleet. In some embodiments, the system may weight road condition metrics higher which are more recent in time. In some embodiments, the system may discard road condition metrics which are older than a threshold. The system may optionally not assign a road condition metric for a road segment which has road information received from less than a threshold number of vehicles within a threshold prior time period.

At block 406, the system generates the road roughness map. The system generates information reflecting road roughness for road segments. A vehicle may request, or be pushed, a road roughness map reflecting road roughness for a geographic area in which the vehicle is located.

Vehicle Block Diagram

Figure 5:
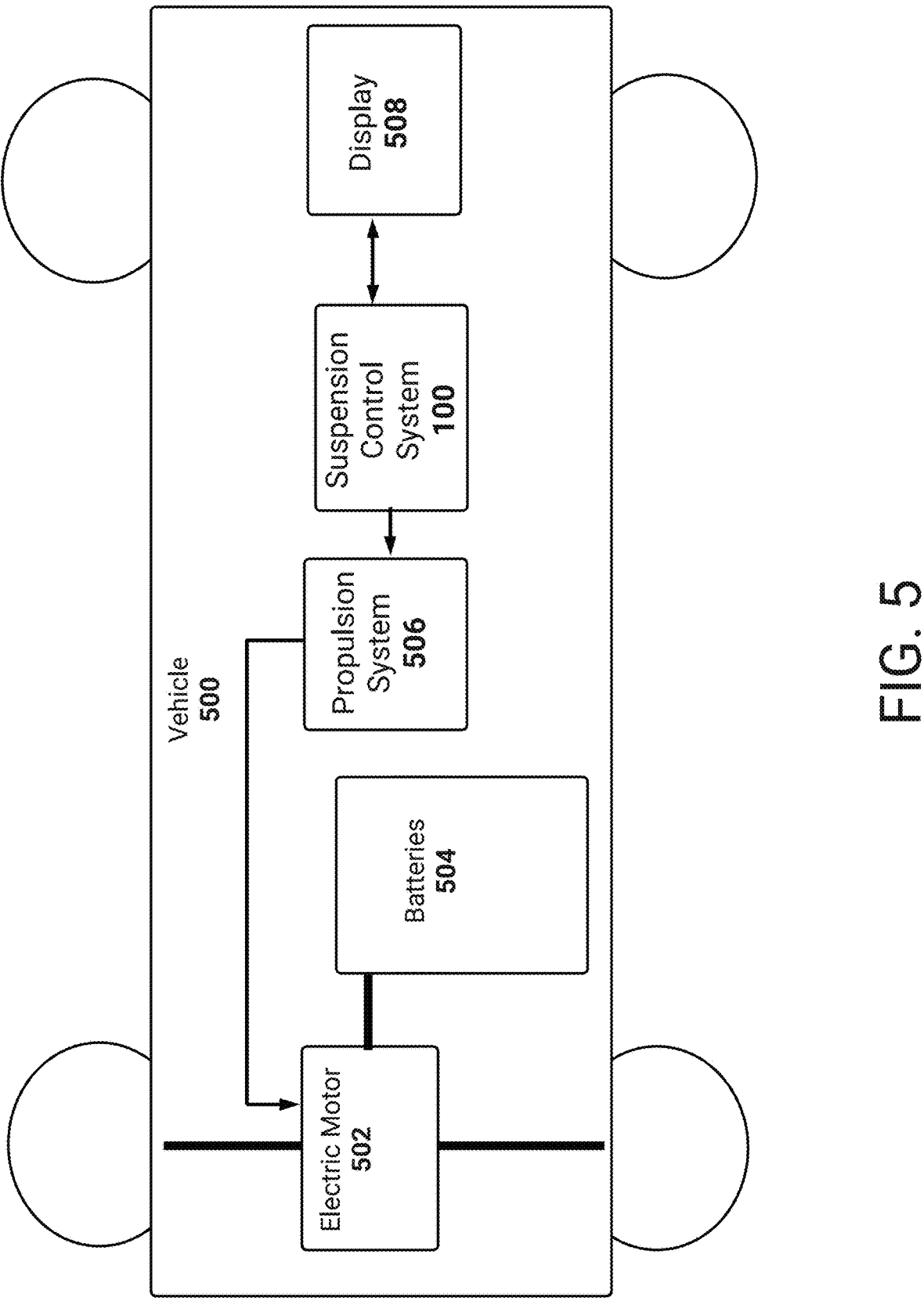
FIG. 5 is a block diagram illustrating an example vehicle which includes the example suspension control system.

FIG. 5 illustrates a block diagram of a vehicle 500 (e.g., vehicle 102). The vehicle 500 may include one or more electric motors 502 which cause movement of the vehicle 500. The electric motors 502 may include, for example, induction motors, permanent magnet motors, and so on. Batteries 504 (e.g., one or more battery packs each comprising a multitude of batteries) may be used to power the electric motors 502 as is known by those skilled in the art.

The vehicle 500 further includes a propulsion system 506 usable to set a gear (e.g., a propulsion direction) for the vehicle. With respect to an electric vehicle, the propulsion system 506 may adjust operation of the electric motor 502 to change propulsion direction.

Additionally, the vehicle includes the suspension control system 100 which adjusts suspension settings associated with the vehicle 102 based on a received road roughness map as described herein. The vehicle 500 may additionally output information to, and receive information (e.g., user input) from, a display 508 included in the vehicle 500. For example, the display 508 may present user interface information as described herein (e.g., user interface 150).

Other Embodiments

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and engines described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a multitude of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A method implemented by a processor system included in a vehicle, the method comprising:

obtaining a road roughness map associated with a geographic area in which the vehicle is located, the road roughness map reflecting road condition metrics for a plurality of road segments that form roads included in the geographic area;

determining, based on the road roughness map, that a threshold percentage of road segments along an upcoming threshold distance of a navigable route exceed a threshold road condition metric; and in response to determining the threshold percentage of road segments exceed the threshold road condition metric, causing adjustment of suspension of the vehicle that is maintained for at least the entirety of the upcoming threshold distance, wherein the suspension is adjusted to reduce an effect of road roughness, and wherein causing adjustment of the suspension comprises adjusting a ride height associated with the vehicle.

2. The method of claim 1, wherein the road roughness map is generated based on road condition information received from a fleet of vehicles, the fleet including the vehicle, and wherein the road condition information is based on at least one measured acceleration change along the plurality of road segments.

3. The method of claim 2, wherein the at least one measured acceleration change is associated with a vertical acceleration change.

4. The method of claim 2, wherein a frequency associated with the at least one measured acceleration change is determined, and wherein the at least one measured acceleration change is discarded based on the frequency being less than a threshold.

5. The method of claim 1, wherein each road segment of the plurality of road segments is a threshold distance of the geographic area.

6. The method of claim 1, wherein the navigable route is directed towards a destination, and wherein the upcoming threshold distance represents a next portion of the navigable route towards the destination.

7. The method of claim 1, wherein the suspension is an air suspension, and wherein adjusting the ride height comprises reducing the ride height associated with the vehicle.

8. A system comprising one or more processors and non-transitory computer storage media storing instructions that when executed by the one or more processors, cause the one or more processors to perform operations comprising:

obtaining a road roughness map associated with a geographic area in which a vehicle is located, the road roughness map reflecting road condition metrics for a plurality of road segments that form roads included in the geographic area;

determining, based on the road roughness map, that a threshold percentage of road segments along an upcoming threshold distance of a navigable route exceed a threshold road condition metric; and in response to determining the threshold percentage of road segments exceed the threshold road condition metric, causing adjustment of suspension of the vehicle that is maintained for at least the entirety of the upcoming threshold distance, wherein the suspension is adjusted to reduce an effect of road roughness, and wherein causing adjustment of the suspension comprises adjusting a ride height associated with the vehicle.

9. The system of claim 8, wherein the road roughness map is generated based on road condition information received from a fleet of vehicles, the fleet including the vehicle, and wherein the road condition information is based on at least one measured acceleration change along the plurality of road segments.

10. The system of claim 9, wherein the at least one measured acceleration change is associated with a vertical acceleration change.

11. The system of claim 9, wherein a frequency associated with the at least one measured acceleration change is determined, and wherein the at least one measured acceleration change is discarded based on the frequency being less than a threshold.

12. The system of claim 8, wherein each road segment of the plurality of road segments is a threshold distance of the geographic area.

13. The system of claim 8, wherein the navigable route is directed towards a destination, and wherein the upcoming threshold distance represents a next portion of the navigable route towards the destination.

14. The system of claim 8, wherein the suspension is an air suspension, and wherein adjusting the ride height comprises reducing the ride height associated with the vehicle.

15. A non-transitory computer storage medium storing instructions that when executed by a system of one or more processors, cause the one or more processors to perform operations comprising:

obtaining a road roughness map associated with a geographic area in which a vehicle is located, the road roughness map reflecting road condition metrics for a plurality of road segments that form roads included in the geographic area;

determining, based on the road roughness map, that a threshold percentage of road segments along an upcoming threshold distance of a navigable route exceed a threshold road condition metric; and in response to determining the threshold percentage of road segments exceed the threshold road condition metric, causing adjustment of suspension of the vehicle that is maintained for at least the entirety of the upcoming threshold distance, wherein the suspension is adjusted to reduce an effect of road roughness, and wherein causing adjustment of the suspension comprises adjusting a ride height associated with the vehicle.

16. The computer storage medium of claim 15, wherein the road roughness map is generated based on road condition information received from a fleet of vehicles, the fleet including the vehicle, and wherein the road condition information is based on at least one measured acceleration change along the plurality of road segments.

17. The computer storage medium of claim 16, wherein the at least one measured acceleration change is associated with a vertical acceleration change.

18. The computer storage medium of claim 16, wherein a frequency associated with the at least one measured acceleration change is determined, and wherein the at least one measured acceleration change is discarded based on the frequency being less than a threshold.

19. The computer storage medium of claim 15, wherein the navigable route is directed towards a destination, and wherein the upcoming threshold distance represents a next portion of the navigable route towards the destination.

20. The computer storage medium of claim 15, wherein the suspension is an air suspension, and wherein adjusting the ride height comprises reducing the ride height associated with the vehicle.

* * * * *